United States Patent

Bossen et al.

[15] 3,671,947

[45] June 20, 1972

[54] ERROR CORRECTING DECODER

[72] Inventors: Douglas C. Bossen, Wappingers Falls; Mu-Yue Hsiao, Poughkeepsie, both of N.Y.

[73] Assignee: International Business Machines Corporation, Armonk, N.Y.

[22] Filed: Sept. 28, 1970

[21] Appl. No.: 75,823

[52] U.S. Cl. ..............................340/146.1 AL, 340/146.1 AV

[51] Int. Cl. ......................................G08c 25/00, G06f 11/12

[58] Field of Search........................340/146.1 AL, 146.1 AV; 235/153

[56] References Cited

UNITED STATES PATENTS

| | | | |
|---|---|---|---|
| 3,437,995 | 4/1969 | Watts | 340/146.1 |
| 3,411,135 | 11/1968 | Watts | 340/146.1 |
| 3,478,313 | 11/1969 | Srinivasan | 340/146.1 |
| 3,544,963 | 12/1970 | Tong | 340/146.1 |
| 3,562,709 | 2/1971 | Srinivasan | 340/146.1 |

*Primary Examiner*—Charles E. Atkinson
*Attorney*—Hanifin and Jancin and William S. Robertson

[57] ABSTRACT

In apparatus for correcting an error in a codeword according to a syndrome, means is provided for transforming the computed syndrome through a succession of syndrome sequences or values and for counting the number of syndrome sequences in the succession. The values of each syndrome sequence are sensed to detect a distinct predetermined value and the bit in error is located from the count of the number of syndrome sequences and inverted for correction. The preferred embodiment uses a shortened Bose-Chaudhuri codeword and uses a linear feedback shift register to transform the syndrome values.

10 Claims, 4 Drawing Figures

ENCODING MATRIX

FIG I

SYNDROME COMPUTING MATRIX

ERROR CORRECTING DECODER

BACKGROUND OF THE INVENTION

This invention relates to correcting errors in codes.

The use of codes to effect correction of errors made in processing information is well known. In general terms the procedure is to form a codeword by augmenting a group of data bits with one or more checkbits computed according to a code. After the codeword has been processed in some operation which may introduce errors in its constituent bits, it is received and decoded to yield the original data. The decoding is usually done by computing a syndrome, which is a sequence of bits containing information about the location of errors in the received codeword. Corrections are then made in the received codeword in accordance with the syndrome to obtain the original data without error.

The preferred embodiment of the present invention deals with a class of codes often called Bose-Chaudhuri or Bose-Chaudhuri-Hocquenghem codes, which are constructed with reference to a generator polynomial. Bose-Chaudhuri codes have a natural length of codeword related to the number of checkbits used in the word and the error correcting capacity of the code. It is sometimes expedient, however, to use a shortened Bose-Chaudhuri code having fewer bits per word than in the natural length of codeword. The preferred embodiment described below deals with such a shortened Bose-Chaudhuri code. Information on the construction of Bose-Chaudhuri codes and their properties is given in reference works well known to those skilled in the information processing art. (For example see Peterson, W. Wesley: *Error Correcting Codes*, The M.I.T. Press, 1961).

SUMMARY OF INVENTION

Objects of this invention are to obtain correct data from codewords that may have errors and to obtain such data quickly and with a small amount of equipment. A preferred embodiment is especially economical in effecting double error correction of shortened Bose-Chaudhuri codewords.

The invention features means for correcting an error in a codeword made up of a predetermined number of bits including checkbits in a sequence of positions including: means for computing a syndrome for the codeword, means for transforming the computed syndrome successively through a succession of values, means for making a count of the values in the succession, means for sensing each of the successive values with a gate responsive to a distinct predetermined value, means for inverting a codeword bit in a position in the bit sequence depending on the count of the values when the gate responds. A preferred embodiment features double error correction of shortened Bose-Chaudhuri codewords using an EXCLUSIVE OR tree connected to receive the codeword as an input and compute a syndrome, a shift register with feedback corresponding to the generator polynomial and connected to receive its input from the tree and to generate a succession of transformed syndromes, each syndrome of the succession being generated from the preceding syndrome, circuitry which maintains a count of the generated syndromes, a plurality of gates, in number equal to one less than the number of bits in the codeword, each gate obtaining inputs from the shift register and connected to emit an output responsive to a distinct syndrome corresponding to a codeword with two errors, one of which two errors is in a predetermined position in the sequence, inversion circuitry connected to the output of the gates and responsive thereto, connected to effect an inversion of a codeword bit at a position in the codeword bit sequence depending on the count of the generated syndromes at the instant one of the gates emits an output.

Other objects, features, and advantages will appear from the following description of a preferred embodiment.

DESCRIPTION OF THE PREFERRED EMBODIMENT

Figure 1:
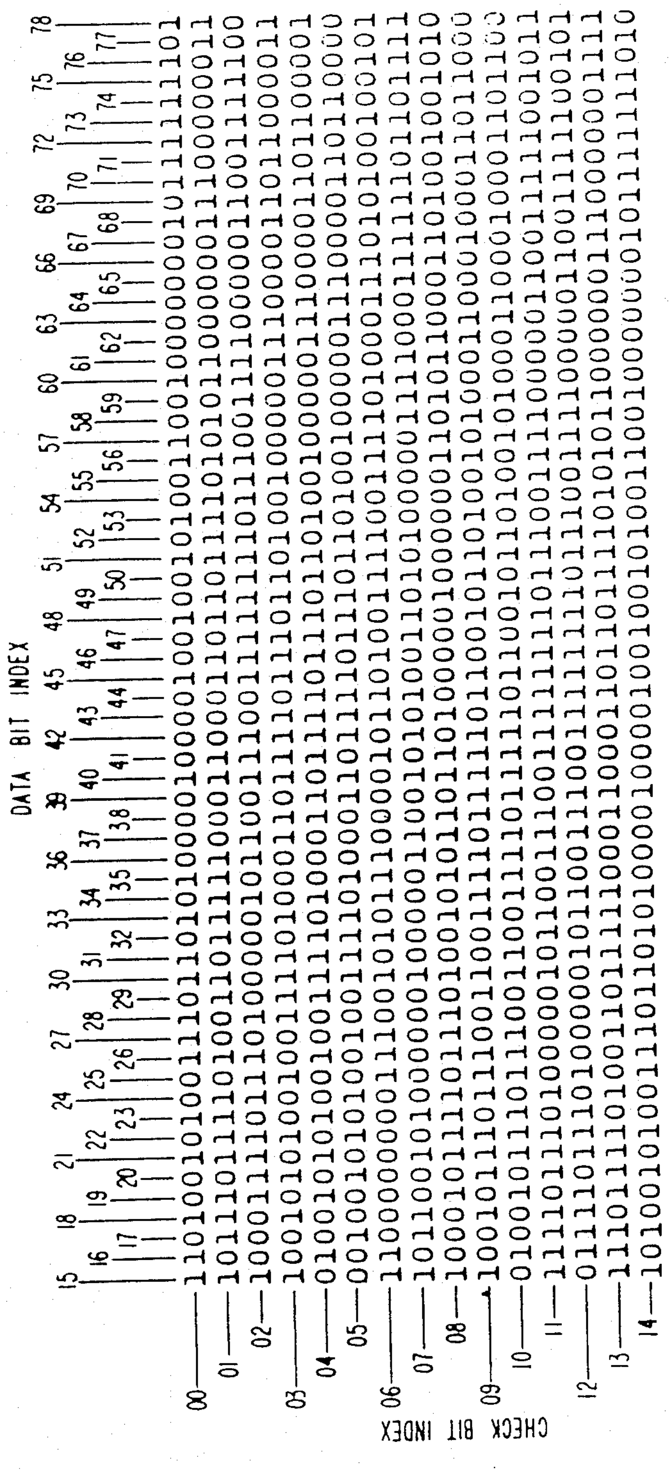
FIG. 1 shows an encoding matrix used to generate codewords to be decoded according to the invention.

The preferred embodiment applies to a shortened Bose-Chaudhuri code having codewords consisting of a sequence of 79 bits, the first 15 of which are checkbits and the remaining 64 of which are data bits. The various bits are designated by an index giving the position of the bit in the codeword. The checkbits are designated $b_{00}, b_{01}, b_{02}, \ldots b_{14}$, while the data bits are designated $b_{15}, b_{16}, b_{17}, \ldots b_{78}$. Each of the checkbits is obtained by modulo-2 addition of several of the data bits. An encoding matrix derived from the generator polynomial summarizes the encoding computation. For the preferred embodiment the generator polynomial is $$g(x) = 1 + x + x^2 + x^3 + x^6 + x^7 + x^8 + x^9 + x^{11} + x^{13} + x^{14} + x^{15}$$

and the encoding matrix derived therefrom (by methods well known in the art) is shown in FIG. 1. The use of the encoding matrix is illustrated by the following procedure for obtaining the checkbit $b_{02}$. Enter the matrix at line 02 corresponding to the index of the checkbit to be computed. Add (modulo-2) the data bits designated by 1's in the 02 line, namely: $b_{15}$, $b_{19}$, $b_{20}$, and so on through the line to $b_{76}$. The resulting sum (modulo-2) is the required checkbit. The other checkbits are obtained in the same manner by referring to the appropriate line of the encoding matrix. The computation of the checkbits by modulo-2 addition is accomplished by electronic circuitry well known in the art and needing no further explanation.

Figure 2:
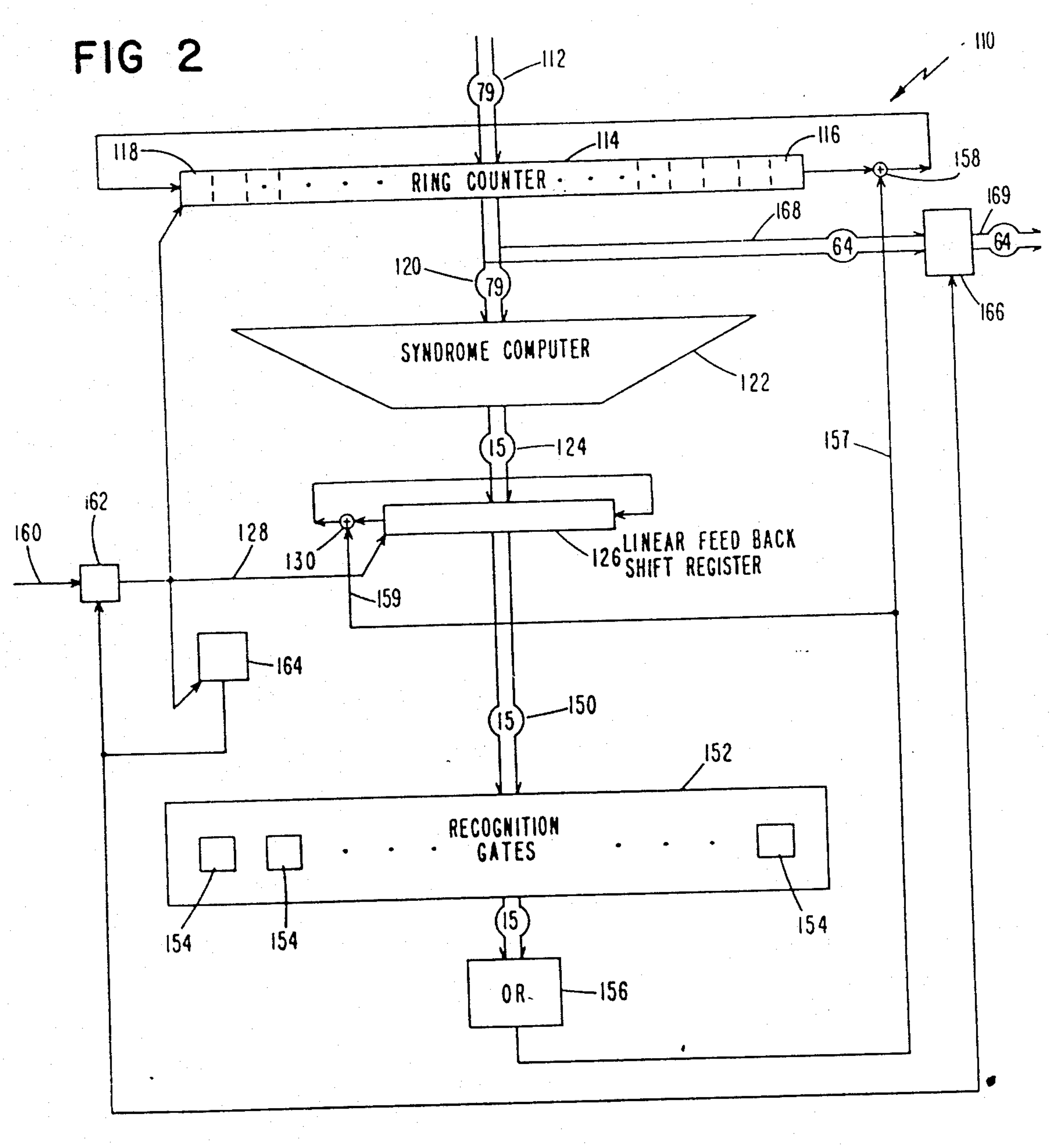
FIG. 2 shows in block diagrammatic form a check bit decoder according to the invention.

In the preferred embodiment it is contemplated that the codeword is stored in a memory and subsequently recalled from the memory for use. The insertion and withdrawal of the codeword from the memory is a process subject to error wherein one or more bits of the codeword may be inverted. As the preferred embodiment is shown in FIG. 2, the codeword is fetched from memory, conveyed through 79-bit channel 112 into check-bit decoder 110, and inserted into ring counter 114 which has 79 positions serially numbered from 00 to 78 corresponding to the 79 bits of the codeword. The 00-position 116 is shown in FIG. 2 at the right, and the 78-position 118, shown on the left of ring counter 114, is connected to the output from position 116. From ring counter 114 a 79-bit channel 120 runs to syndrome computer 122.

Syndrome computer 122 in the preferred embodiment is an EXCLUSIVE OR tree organized to compute a syndrome consisting of 15 bits each obtained by addition (modulo-2) of several bits of the received codeword. The computation of the syndrome bits is organized in accordance with the syndrome computation matrix of FIG. 3 as shown in the following example. In order to compute, say, the fifth syndrome bit, enter the table horizontally at the fifth line and add (modulo-2) the bits from the codeword indicated by the presence of a 1 in the fifth line; namely, $b_4$, $b_{16}$, $b_{19}$, $b_{21}$, $b_{23}$, $b_{26}$, and so on across the line to $b_{78}$. Other syndrome bits are obtained by a corresponding process using the appropriate line of the syndrome computing matrix. In accordance with the code theory the syndrome value (i.e., a sequence of 15 bits in the preferred embodiment) will be (00000 00000 00000) if no error is present in the received codeword. If a single bit of the codeword is in error, the values will be given by the column in the checkbit decoding matrix with index corresponding to the index of the erroneous bit. (For example, if $b_{27}$ were in error, the syndrome value would be (10000 11010 10011) ). If two bits of the codeword are in error, the value would be the sum (modulo-2) of the two corresponding columns from the decoding matrix. (For example, if $b_{20}$ and $b_{30}$ were in error, the value would be (11101 01110 10000) ).

Figure 4:
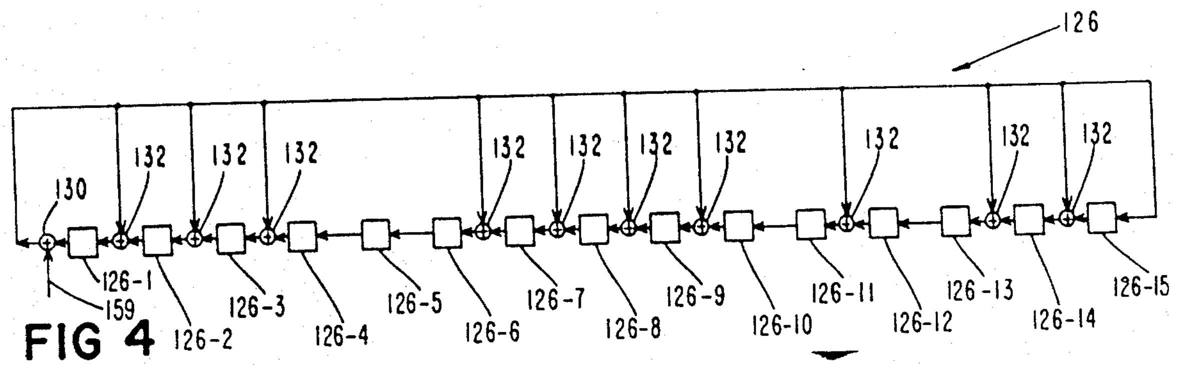
FIG. 4 shows in greater detail the shift register appearing in FIG. 2.

From syndrome computer 122 a 15-bit channel 124 runs to transform circuitry organized according to the generator polynomial, which circuitry in the preferred embodiment is a serial linear feedback shift register 126 with 15 positions 126–1 through 126–15. The interconnections of the register 126 are shown in greater detail in FIG. 4. Shift register 126 is connected so that at a signal from a timing pulse introduced on lead 128 each register position 126–2 through 126–15 transmits its content to the register position to the left as indicated in FIG. 4. The leftmost register position 126–1 transmits its content to EXCLUSIVE OR gate 130, the output from which is fed to the inputs of register positions 126–1, 126–2, 126–3, 126–4, 126–6, 126–7, 126–8, 126–9, 126–11, 126–13, and 126–14 corresponding respectively to the presence in the generator polynomial of the 1st, 2nd, 3rd, 6th, 7th, 8th, 9th, 11th, 13th, 14th, and 15th powers of $x$. Where a position has two inputs, they are combined by modulo-2 addition in EXCLUSIVE OR gates 132. The organization of shift register 126 is such that if any column of the syndrome matrix (FIG. 3) is present in the register, a shift will transform the register contents to that of the column next to the left (as laid out in FIG. 3). For example, if the shift register were filled from left to right with the sequence of bits (10010 10001 01101), this being the value of the 71-column, the value appearing in the register after shift is (11001 11100 01101), this being the value of the 70-column.

Figure 3:
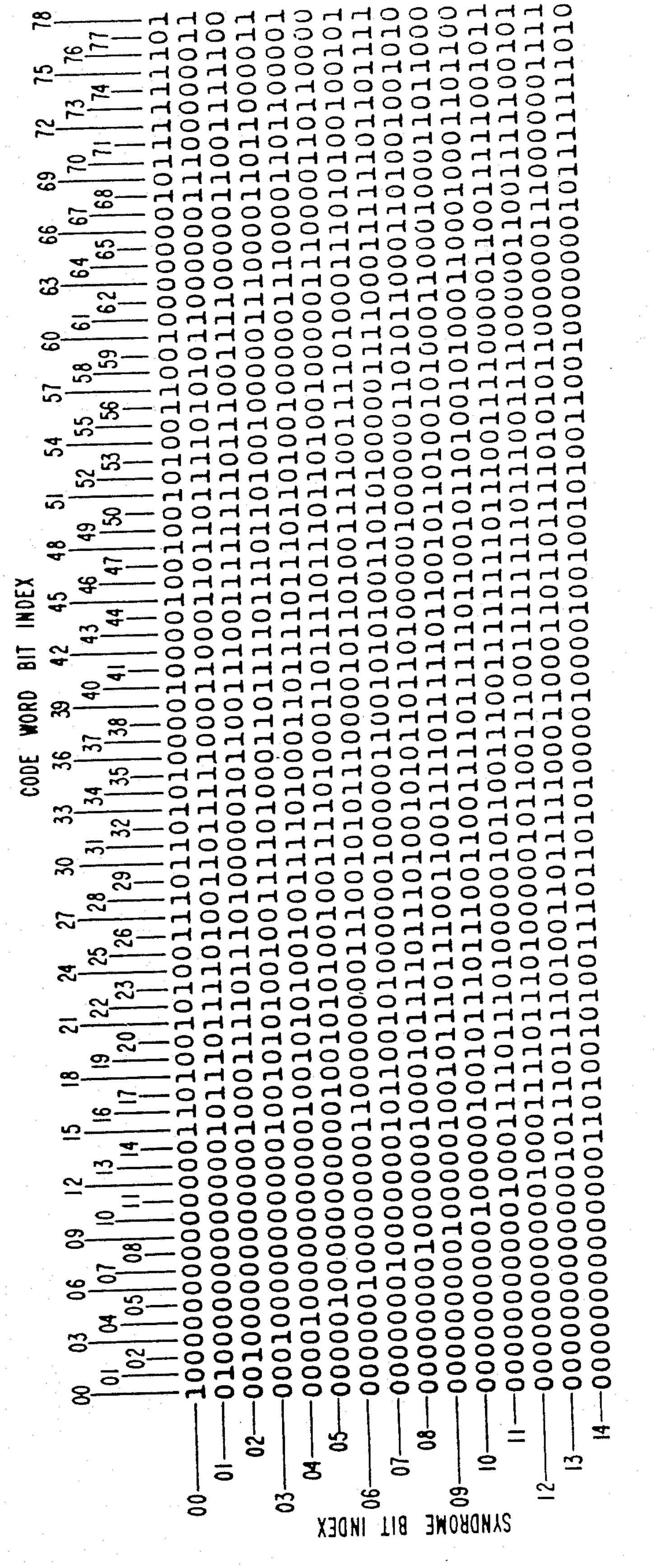
FIG. 3 shows a decoding matrix descriptive of the organization of the decoder of FIG. 2.

The output from shift register 126 is conveyed through 15-bit channel 150 to a bank 152 of recognition gates 154. In the preferred embodiment there are 79 recognition gates assigned indices thus: $G_{00}$, $G_{01}$, $G_{02}$, . . . $G_{78}$. As will be seen hereafter, $G_{00}$ is employed in the correction of codewords with a single error, while gates $G_{01}$ through $G_{78}$ are employed in the correction of codewords with double errors. Each gate 154 has an input from each position of register 126, i.e., 15 inputs in the preferred embodiment, and is connected to be responsive (that is, to emit a pulse corresponding to a 1) only when its inputs are presented with a specified value (that is, a particular pattern of 1's and 0's). The response value for each of gates 154 is obtained from the syndrome computation matrix (FIG. 3). Specifically, the response value for $G_{00}$ is equal to the 00-column of the matrix, and the response values for $G_{01}$, $G_{02}$, . . . $G_{78}$ are obtained by bit-wise addition (modulo-2) of the 00-column with the 01-column, the 02-column, . . . 78-column respectively. The response values for the several gates 154 obtained by the described method are given explicitly in Table 1.

TABLE 1

| Gate Index | Gate Response Pattern |
|---|---|
| 00 | 10000 00000 00000 |
| 01 | 11000 00000 00000 |
| 02 | 10100 00000 00000 |
| 03 | 10010 00000 00000 |
| 04 | 10001 00000 00000 |
| 05 | 10000 10000 00000 |
| 06 | 10000 01000 00000 |
| 07 | 10000 00100 00000 |
| 08 | 10000 00010 00000 |
| 09 | 10000 00001 00000 |
| 10 | 10000 00000 10000 |
| 11 | 10000 00000 01000 |
| 12 | 10000 00000 00100 |
| 13 | 10000 00000 00010 |
| 14 | 10000 00000 00001 |
| 15 | 01110 01111 01011 |
| 16 | 00001 01000 11110 |
| 17 | 11000 10100 01111 |
| 18 | 01010 00101 01100 |
| 19 | 11101 00010 10110 |
| 20 | 10110 10001 01011 |
| 21 | 01101 00111 11110 |
| 22 | 11110 10011 11111 |
| 23 | 01001 00110 10100 |
| 24 | 11100 10011 01010 |
| 25 | 10110 01001 10101 |
| 26 | 01101 01011 10001 |
| 27 | 00000 11010 10011 |
| 28 | 00110 00010 00010 |
| 29 | 11011 00001 00001 |
| 30 | 01011 11111 11011 |
| 31 | 00011 10000 10110 |
| 32 | 11001 11000 01011 |
| 33 | 01010 10011 01110 |
| 34 | 11101 01001 10111 |
| 35 | 01000 11011 10000 |
| 36 | 11100 01101 11000 |
| 37 | 10110 00110 11100 |
| 38 | 10011 00011 01110 |
| 39 | 10001 10001 10111 |
| 40 | 01110 10111 10000 |
| 41 | 11111 01011 11000 |
| 42 | 10111 10101 11100 |
| 43 | 10011 11010 11110 |
| 44 | 10001 11101 01111 |
| 45 | 01110 10001 11100 |
| 46 | 11111 01000 11110 |
| 47 | 10111 10100 01111 |
| 48 | 01101 10101 01100 |
| 49 | 11110 11010 10110 |
| 50 | 10111 01101 01011 |
| 51 | 01101 11001 11110 |
| 52 | 11110 11100 11111 |
| 53 | 01001 00001 00100 |
| 54 | 11100 10000 10010 |
| 55 | 10110 01000 01001 |
| 56 | 01101 01011 01111 |
| 57 | 00000 11010 11100 |
| 58 | 11000 01101 01110 |
| 59 | 10100 00110 10111 |
| 60 | 01100 01100 00000 |
| 61 | 11110 00110 00000 |
| 62 | 10111 00011 00000 |
| 63 | 10011 10001 10000 |
| 64 | 10001 11000 11000 |
| 65 | 10000 11100 01100 |
| 66 | 10000 01110 00110 |
| 67 | 10000 00111 00011 |
| 68 | 01110 01100 11010 |
| 69 | 11111 00110 01101 |
| 70 | 01001 11100 01101 |
| 71 | 00010 10001 01101 |
| 72 | 00111 00111 11101 |
| 73 | 00101 11100 10101 |
| 74 | 00100 10001 00001 |
| 75 | 00100 00111 11011 |
| 76 | 00100 01100 10110 |
| 77 | 11010 00110 01011 |
| 78 | 01011 01100 01110 |

The gates are constructed with conventional electronic circuitry well known in the art.

The outputs from recognition gates 154 are fed into OR gate 156. The output of OR gate 156 is conducted by lead 157 to EXCLUSIVE OR gate 158 and by lead 159 to EXCLUSIVE OR gate 130. A timing pulse is brought on lead 160 to timing gate 162 from which a timing pulse is conducted to counter 164, to shift register 126, and to ring counter 114. Outputs from counter 164 lead to timing gate 162 and to data gate 166. A 64-bit channel 168 connects ring counter 114 to the input of data gate 166, from which 64-bit channel 169 conveys data out of the decoder 110. Control circuitry (not shown) implements the orderly movement of information bits through decoder 110. This circuitry is well known to designers of information processing apparatus and need not be explained here.

In operation, the 79-bit codeword is fetched into ring counter 114 through channel 112. The codeword bits are then admitted through channel 120 to the inputs of syndrome computer 122 which computes and emits a 15-bit syndrome. The syndrome passes through channel 124 and is loaded into shift register 126. Timing pulses coming from timing gate 162 cause shift register 126 to successively transform the contents of the register through a succession of values, the transformation being determined by the structure of the feed-back loops of the register and characterized by the polynomial. As the transformations proceed in the shift register step by step, the codeword bits are correspondingly rotated step by step around ring counter 114 while counter 164 tallies the number of shifts made. Each of the successive values appearing in the shift register is presented through channel 150 to the plurality of gates 154. When the value presented corresponds to the response pattern of none of the gates, no output is emitted from gates 154, the OR gate 156 is not stimulated, no output is transmitted from the OR gate to EXCLUSIVE OR gates 158 and 130, and the content of ring counter position 116 is inserted unchanged into position 118.

When, on the other hand, the value presented to gates 154 corresponds to the response pattern of some one of the gates 154, that gate responds by emitting a pulse which stimulates the OR gate 156, which in turn transmits a pulse to EXCLUSIVE OR gates 158 and 130. The EXCLUSIVE OR gate 158 thereupon inserts an inverted value of the content of ring counter position 116 into position 118, while EXCLUSIVE OR gate 130 inverts the content of register 126–1 before inserting it into the feed-back loops.

After 79 shifts counter 164 emits a pulse which terminates the shifting by closing timing gate 162. The codeword has been rotated around to its original position in ring counter 114 at this point but with perhaps some of its bits altered by inversion in passing through EXCLUSIVE OR gate 158. The same pulse from counter 164 at this point opens read out gate 166, and the contents of ring counter 116 pass out of the decoder through channels 168 and 169.

The effect of the above described operation in correcting errors can be summarized as follows. If there is a single bit in error in the codeword, the syndrome originally loaded into the shift register will be shifted through a succession of values to become equal to (10000 00000 00000), the response value of $G_{00}$ at just the time when the erroneous bit is shifted into position 116 of the ring counter, so that the corrective action elicited by presenting the response value to $G_{00}$ will be applied to the erroneous bit. If there are two erroneous bits in the codeword, the syndrome originally loaded into the shift register will be shifted through a succession of values to become equal to the response value of one of the gates $G_{01}, G_{02}, \ldots G_{78}$ at just the time when the first erroneous bit is shifted into position 116 of the counter. (It may be noted that the index of the responding gate corresponds to the difference in the indices of the erroneous bits, and the number of shifts before response corresponds to the lower index of the two erroneous bits.) As the first erroneous bit is corrected, the contents of the shift register are correspondingly altered. Subsequent shifts transform the value in the shift register to (10000 00000 00000) and elicit a response from $G_{00}$ just as the second erroneous bit arrives in position 116 to effect the correction of the second bad bit.

It can readily be seen that the apparatus according to the invention employs only one recognition gate to recognize any possible single error in the codeword (i.e., in the preferred embodiment all 79 possible single errors are recognized by gate $G_{00}$) and uses a plurality of recognition gates in number one less than the number of bits in the codeword to recognize any possible double error pattern (i.e., in the preferred embodiment all 3,081 possible double error combinations are recognized by gates $G_{01}$ through $G_{78}$).

That the operation as described will read out correct data from any codeword having not more than two bits in error can be more concretely illustrated by a specific example in which it is supposed that the codeword fetched from memory has errors in bits $b_{20}$ and $b_{44}$. The syndrome computed in this case will be given according to the theory of Bose-Chaudhuri codes as the sum (modulo-2) of the columns of the decoding matrix with indices 20 and 44, namely: (00111 01100 00100). The computed syndrome is loaded into the shift register and the shifting succession begins. After the first shift the contents of the shift register will be the sum of columns with indices 19 and 43, namely: (01110 11000 01000); after the second shift the contents will be the sum of the columns with indices 18 and 42, namely: (11101 10000 10000), and so on through successive shifts. After each shift the value in the shift register is presented to the recognition gates 154. Through the first 19 shifts none of the values correspond to the response structure of any of the recognition gates, and no output is emitted to the OR gate 156 and thence to gates 158 and 130. The bits of the codeword have been all the while undergoing shifts around ring counter 114 with the bits which are shifted out of the right ring counter position 116 reinserted without change into the left ring counter position 118. After the 20th shift, however, the erroneous $b_{20}$ will be in register 116 of the ring counter and the value in the shift register 126 will be transformed to the sum (modulo-2) of columns 00 and 24 (in the decoding matrix, FIG. 3); namely: (11100 10011 01010). This value corresponds to the response structure of recognition gate $G_{24}$, so that a pulse will be emitted by $G_{24}$ to gate 156, and thence to gates 158 and 130. The result will be that at the next shift an inverted (and therefore corrected) $b_{20}$ will be inserted in position 118 of ring counter 114, and a corresponding change made in the contents of the shift register. After the 21st shift the situation will be that ring counter 114 will contain a single erroneous bit, $b_{44}$, now located 23 positions from the rightmost register 116, while the shift register will contain the value (11001 00110 10100) corresponding to the column with index 23 as shown in FIG. 3. After another 23 uneventful shifts, $b_{44}$ will appear in register 116 while the value (10000 00000 00000) will be found in the shift register. Gate $G_{00}$ will respond to this value and initiate correction of bit $b_{44}$ on the next shift in the same manner as described above. Following the correction of $b_{44}$ the value in the shift register will be (00000 00000 00000) corresponding to an errorless codeword. After another sequence of uneventful shifts there will have been an aggregate of 79 shifts and the bits of the codeword will be returned to their original positions in ring counter 114. At this point the shifting is terminated, and the now correct data is emitted from the decoder through data gate 166.

One advantage of the error correction decoder of this invention is that the output 124 of syndrome computer 122 can be applied to conventional circuits (not shown) for correcting single errors and detecting double errors. An error correcting circuit of this type is disclosed in application Ser. No. 790,142 of E. Kolankowsky and A. K. Pattin, Jr., now U.S. Pat. No. 3,573,728, issued Apr. 6, 1971 and assigned to the assignee of this invention. Thus, the more likely single errors are handled by circuits that are inherently faster than shift registers. If a double error is detected by these circuits, the double error correcting circuit already described is used to correct the double error.

We claim:

1. Apparatus for correcting an error in a codeword made up of a predetermined number of bits including check bits in a sequence of positions, including:
   - means for computing a syndrome for the codeword,
   - means for transforming the computed syndrome successively through a succession of syndrome sequences by successive application of a single transformation function to generate each sequence from the next preceding one,
   - means for making a count of the number of transformations in the succession of syndrome sequences,
   - gate means connected to the output of said means for transforming the computed syndrome for sensing each of the successive syndrome sequences and responsive to a distinct predetermined sequence,
   - means connected to be responsive to said gate means and to said count means for inverting a codeword bit in a position in the bit sequence depending on the count of the number of transformations when said gate means responds.

2. The apparatus of claim 1 for correcting a codeword having erroneous bits in two of the positions; wherein the code is characterized by a generator polynomial; wherein the transformation function is characterized by the generator polynomial; wherein each syndrome sequence corresponds to a codeword error pattern; wherein each transforming of a syndrome sequence corresponds to displacing the pattern along the sequence of bits of the codeword; and wherein the sensing is effected by a plurality of gates in number one less than the number of bits in the codeword, each gate being responsive to a syndrome sequence corresponding to an error pattern with a distinct interval between the error positions.

3. Apparatus for correcting errors in a codeword with a predetermined number of bits in a sequence and being encoded according to a code characterized by a generator polynomial, the apparatus comprising:

a syndrome computer connected to receive the codeword as an input and compute a syndrome corresponding to the codeword, transform circuitry connected to receive the computed syndrome as input and generate a succession of transformed syndromes each successive syndrome of the succession being generated from the preceding syndrome, circuitry to maintain a count of the generated syndromes, a plurality of gates having as inputs the syndromes generated by the transform circuitry, each gate constructed to emit an output in response to a distinct predetermined syndrome, inversion circuitry connected to receive the bit position of said codeword defined by said count circuitry and connected to respond to the output of said gates to invert a codeword bit position for correcting an error.

4. The apparatus of claim 3 wherein the syndrome computer comprises an EXCLUSIVE OR tree.

5. The apparatus of claim 3 wherein the transform circuitry comprises a shift register with feedback corresponding to the generator polynomial.

6. The apparatus of claim 3 wherein each gate is responsive to a syndrome corresponding to a codeword with an error in a predetermined position.

7. The apparatus of claim 3 wherein the count is maintained by serially shifting the codeword around a ring counter.

8. The apparatus of claim 7 wherein the inversion circuitry includes an EXCLUSIVE OR circuit having an input connected to the ring counter.

9. Apparatus for correcting errors in a codeword with a predetermined number of bits in a sequence and being encoded according to a code characterized by a generator polynomial, the apparatus comprising:

an EXCLUSIVE OR tree connected to receive the codeword as an input and compute a syndrome, a shift register with feedback corresponding to the generator polynomial and connected to receive its input from the tree and to generate a succession of transformed syndromes, each syndrome of the succession being generated from the preceding syndrome, circuitry which maintains a count of the generated syndromes, a plurality of gates, in number equal to one less then the number of bits in the codeword, each gate obtaining inputs from the shift register and connected to emit an output responsive to a distinct syndrome corresponding to a codeword with two errors one of which two errors is in a predetermined position in the sequence, inversion circuitry connected to receive the bit position of said codeword defined by said count circuitry and connected to respond to the output of said gates to invert a codeword bit position for correcting an error.

10. The apparatus of claim 9 in which the code is a shortened Bose-Chaudhuri code.

* * * * *